(12) United States Patent
Kim (10) Patent No.: US 7,097,317 B2
(45) Date of Patent: Aug. 29, 2006

(54) LIQUID CRYSTAL DISPLAY MODULE

(75) Inventor: Jae Bum Kim, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/963,549

(22) Filed: Oct. 14, 2004

(65) Prior Publication Data

US 2005/0122707 A1    Jun. 9, 2005

(30) Foreign Application Priority Data

Dec. 8, 2003    (KR)    .................... 10-2003-0088594

(51) Int. Cl.
*G01D 11/28* (2006.01)
*G02F 1/1335* (2006.01)

(52) U.S. Cl. .............................. 362/29; 362/27; 362/30

(58) Field of Classification Search .................. 362/27, 362/29, 30, 561, 601, 606, 607, 612, 613, 362/614, 618, 623, 624, 627
See application file for complete search history.

(56) References Cited

U.S. PATENT DOCUMENTS

| 4,714,983 A | * | 12/1987 | Lang | ........................... 362/27 |
| 5,134,549 A | * | 7/1992 | Yokoyama | ................... 362/623 |
| 6,874,900 B1 | * | 4/2005 | Hsieh | ........................... 362/29 |
| 2004/0105247 A1 | * | 6/2004 | Calvin et al. | .................. 362/27 |
| 2004/0218388 A1 | * | 11/2004 | Suzuki | ........................ 362/561 |

FOREIGN PATENT DOCUMENTS

| JP | 2003-331604 | 11/2003 |
| KR | 10-2004-72274 | 8/2004 |
| KR | 10-2004-83891 | 10/2004 |

\* cited by examiner

*Primary Examiner*—Y. My Quach-Lee
(74) *Attorney, Agent, or Firm*—Morgan, Lewis & Bockius, LLP

(57) ABSTRACT

A liquid crystal display module includes: a liquid crystal display panel; an array of light sources emitting different color lights; and a light guide plate for mixing the different color lights emitted from the light sources, wherein the array of light sources is arranged near a middle of a rear surface of the light guide plate.

21 Claims, 9 Drawing Sheets

LIQUID CRYSTAL DISPLAY MODULE

This application claims the benefit of Korean Patent Application No. P2003-88594 filed in Korea on Dec. 8, 2003, which is hereby incorporated by reference.

BACKGROUND OF THE INVENTION

1. Field of the Invention

The present invention relates to a liquid crystal display module, more particularly, a liquid crystal display module for improving display quality.

2. Description of the Related Art

In general, a liquid crystal display (LCD) device includes a liquid crystal display module and a driving circuitry for driving the liquid crystal display module. The liquid crystal display module includes a liquid crystal display panel having liquid crystal cells arranged in a matrix between two glass substrates, and a back light unit for irradiating light through the liquid crystal display panel. In addition, optical sheets for directing the light from the back light unit toward the liquid crystal display panel in a vertical direction are arranged on the liquid crystal display module. The liquid crystal display panel, the back light unit and the optical sheets should be engaged with each other so as to be integral to prevent light loss and protected from damage due to external impact. Thus, a case is provided for the LCD device to enclose the back light unit and the optical sheets as well as the edges of the liquid crystal display panel.

Figure 1:
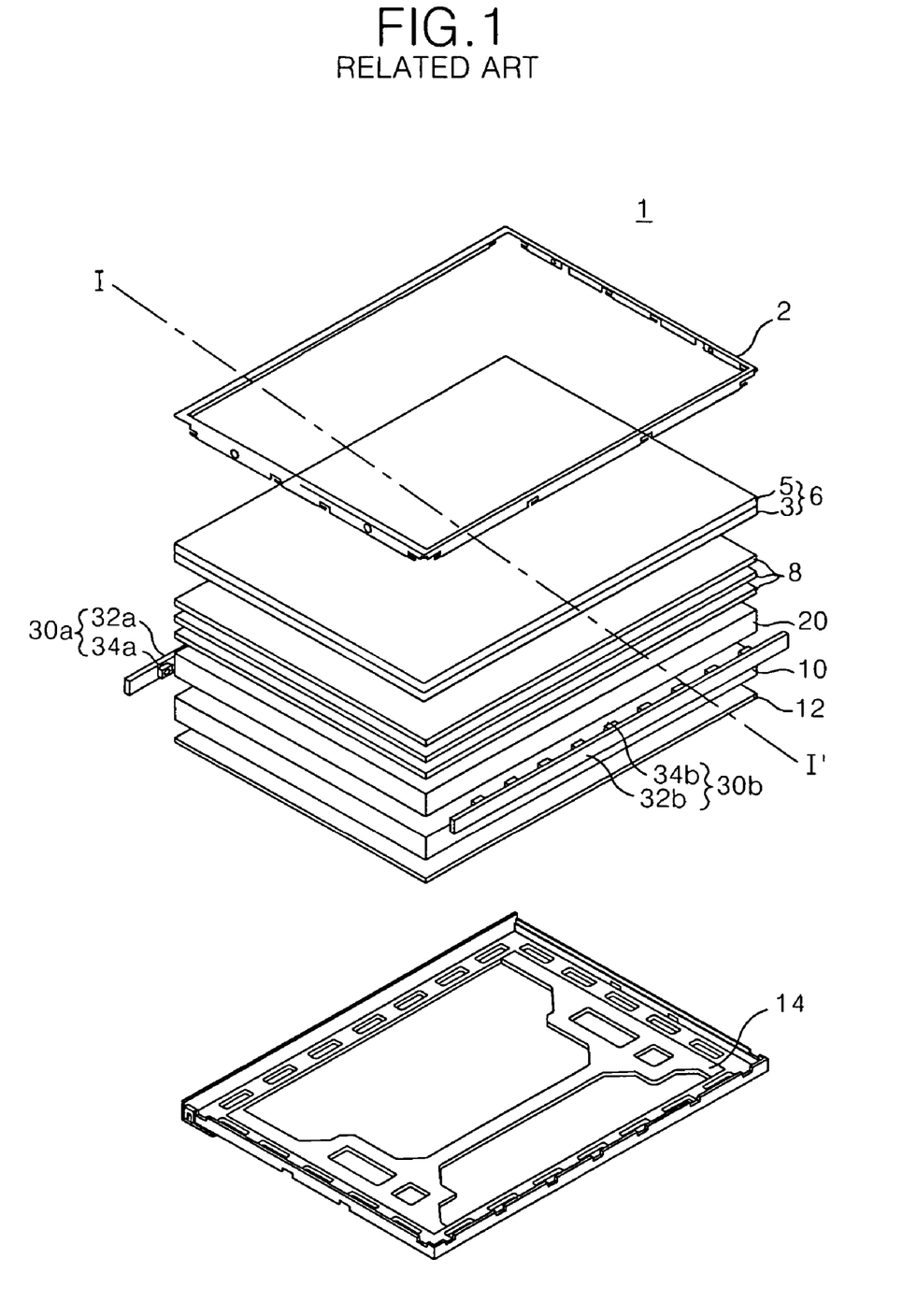
FIG. 1 is an expanded perspective view illustrating the related art liquid crystal display module.
Figure 2:
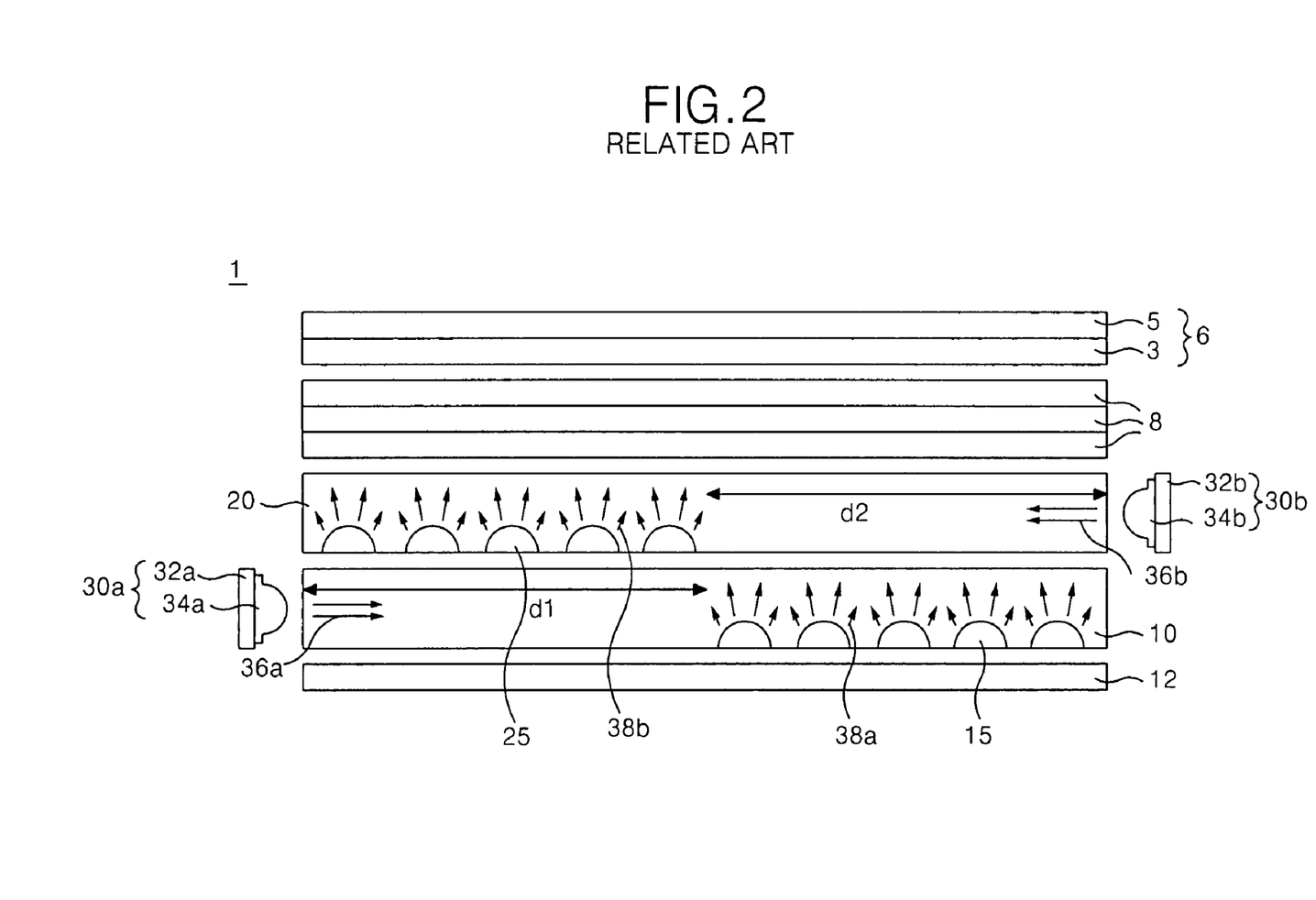
FIG. 2 is a cross-sectional view illustrating the liquid crystal display module taken along line I–I' in FIG. 1.

FIG. 1 is an expanded perspective view illustrating the related art liquid crystal display module. FIG. 2 is a sectional view illustrating the liquid crystal display module taken along line I–I' in FIG. 1. Referring to FIGS. 1 and 2, the liquid crystal display module 1 includes a main support 14, a back light unit and a liquid crystal display panel 6 stacked inside of the main support 14, and a top case 2 for enclosing the edge of the liquid crystal display panel 6 and the side surface of the main support 14.

The liquid crystal display panel 6 includes an upper substrate 5 and a lower substrate 3. Liquid crystal materials are injected between the upper substrate 5 and the lower substrate 3. The liquid crystal display panel 6 is provided with a spacer (not shown) for maintaining a cell gap between the upper substrate 5 and the lower substrate 3. The upper substrate 5 of the liquid crystal display panel 6 is provided with a color filter, a common electrode and a black matrix (not shown). Signal lines, such as a data line and a gate line (not shown) are formed on the lower substrate 3 of the liquid crystal display panel 6. A thin film transistor (TFT) is formed adjacent to a crossing of the data line and the gate line. The TFT switches a data signal from the data line to the liquid crystal cell in response to a scanning pulse (i.e., a gate pulse) from the gate line. A pixel electrode is formed in a pixel region defined between the data line and the gate line.

A pad area is formed at one side of the lower substrate 3 and has pads connected to each of the data line and the gate line. A tape carrier package (not shown) having a driver integrated circuit mounted thereon for applying driving signals to the TFT is attached onto the pad area. The tape carrier package applies data signals from the driver integrated circuit to the data lines. Further, the tape carrier package supplies the scanning signal to the gate line. An upper polarizing sheet is attached onto the upper substrate 5 of the liquid crystal display panel 6 and a lower polarizing sheet is attached onto of the rear side of the lower substrate 3 of the liquid crystal display panel 6.

The main support 14 is made from a mold material, and its inner lateral wall is molded into a stepped coverage face. The stepped coverage face has a securing part in which the back light unit and the liquid display panel 6 are disposed. The liquid crystal display panel 6 and the back light unit are stacked in the securing part of the main support 14.

The recent trend in the back light unit is towards small size, thin thickness and lightweight. Pursuant to this trend, an LED array has been used as a light source, which is advantageous in a power consumption, thickness, weight and brightness in comparison with a fluorescent lamp that is used as a light source for the back light unit.

Figure 3:
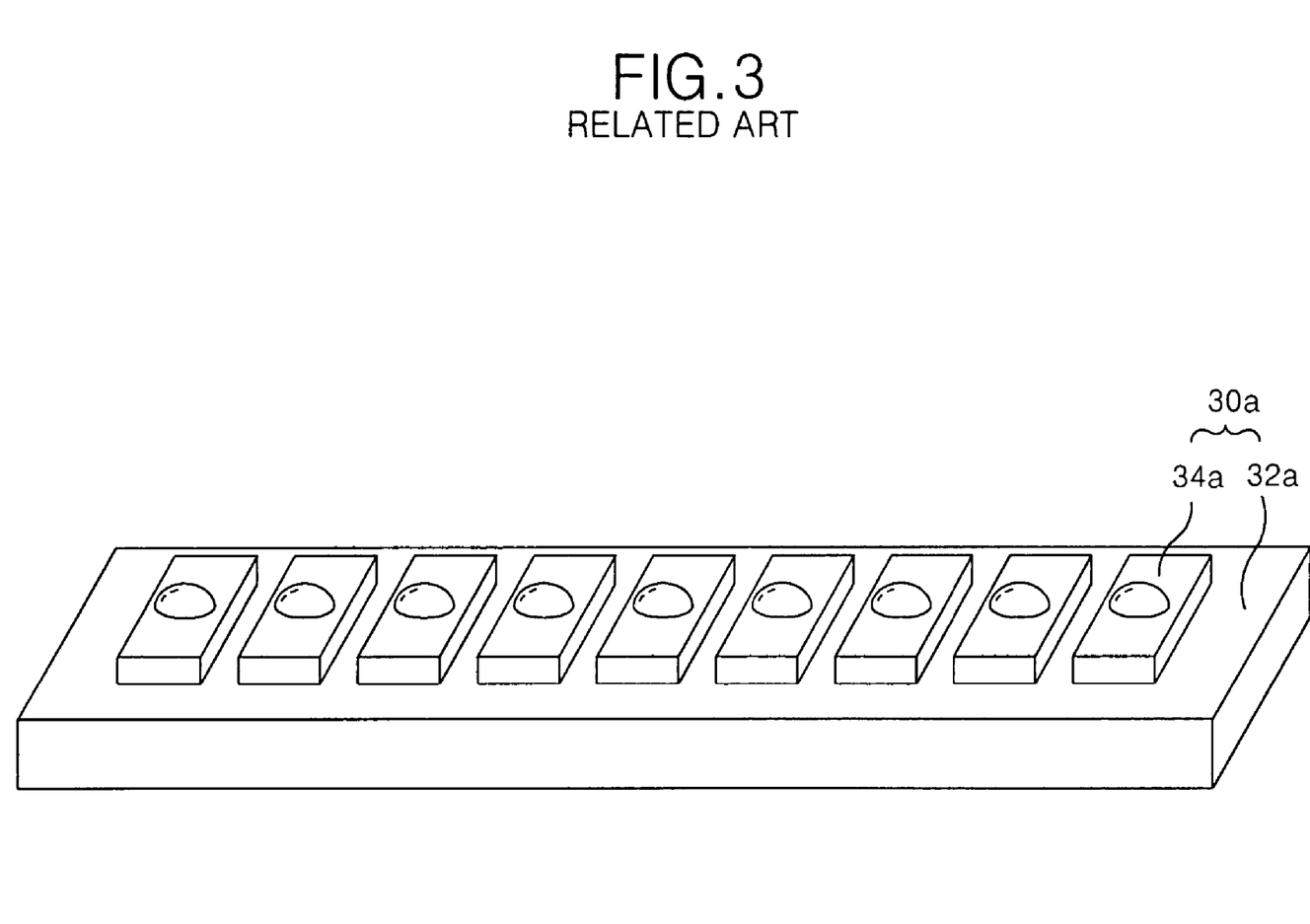
FIG. 3 is a perspective view illustrating the related art light-emitting diode array.

The back light unit includes: first and second light guide plates 10 and 20, which are stacked in two layers to face the liquid crystal display panel 6; a first light-emitting diode (LED) array 30a arranged to face one side surface of the first light guide plate 10; a second LED array 30b arranged to face the other side surface of the second light guide plate 20; a reflection sheet 12 arranged on a rear surface of the first light guide plate 10; and a plurality of optical sheets 8 stacked between the second light guide plate 20 and the liquid crystal display panel 6. FIG. 3 is a perspective view illustrating the related art light-emitting diode array. The first LED array 30a includes a plurality of LED driving circuits 34a and a printed circuit board (PCB) 32a on which the LED driving circuits 34a are arranged in parallel, as shown in FIG. 3. Each of the LED driving circuits 34a includes an LED, which functions as a point light source, for emitting an incoherent light color, such as a red light, a green light or a blue light, and a control circuit for controlling the emission of the LED. The first LED array 30a is arranged to face the incident surface provided at one side surface of the first light guide plate 10.

The second LED array 30b has configuration elements and a structure identical to that of the first LED array 30a shown in FIG. 3. For instance, the PCB 32 and the plurality of LED driving circuits 34a of the first LED array 30a correspond to PCB 32b and a plurality of LED driving circuits 34b of the second LED array 30. Accordingly, an explanation of the second LED array 30b will be substituted with the explanation of the first LED array 30a. The second LED array 30b is arranged to face the incident surface provided at the other side surface of the second light guide 20.

Lights generated from each of the first and the second LED arrays 30a and 30b are irradiated to the first and the second light guide plates 10 and 20 via the incident surfaces of the first and the second light guide plates 10 and 20, respectively. Each of the first and the second light guide plates 10 and 20 converts a path of the light incident from each of the first and the second LED arrays 30a and 30b to be perpendicular to the liquid crystal display panel 6.

A scattering pattern 15 is provided on a rear surface of the other side of the first light guide plate 10 and is separated from the first LED array 30a. The scattering pattern 15 reflects the light irradiated from the first LED array 30a via the incident surface of the first light guide plate 10 and scatters the lights to diffuse toward the second light guide plate 20. The scattering pattern 15 is separated by the designated distance d1 from the incident surface of the first light guide plate 10 to mix the red, green and blue color lights irradiated from the first LED array 30a so as to convert them into a white color.

A scattering pattern 25 is provided on a rear surface of the other side of the second light guide plate 20 and is separated from the second LED array 30b. The scattering pattern 25 reflects the light irradiated from the second LED array 30b via the incident surface of the second light guide plate 20 and scatters the light to make it diffuse toward the optical sheets 8. The scattering pattern 25 is separated by the designated distance d2 from the incident surface of the second light guide plate 20 to mix the red, the green and the blue color lights irradiated from the second LED array 30b into a white color.

The reflection sheet 12 is located at the rear surface of the first light guide plate 10, and serves to re-reflect the light incident thereto through the rear surface of the first light guide plate 10 into the first light guide plate 10, thereby reducing a light loss. In other words, the light irradiated on each of the first and the second light guide plates 10 and 20 that progresses toward a lower surface of the first and the second light guide plate 10 and 20 is reflected by the reflection sheet 12 to be redirected toward the liquid crystal display panel 6.

Each of the optical sheets 8 diffuses the lights provided from the first light guide plate 10 and the second light guide plate 20 and converts the paths of the lights to be perpendicular to the liquid crystal display panel 6, to thereby improve light efficiency. To this end, a lower diffusing sheet is stacked on the second light guide plate 20 for diffusing the light provided from the first and second light guide plates 10 and 20 into the entire area, first and second prism sheets for converting a progress angle of the light diffused by the lower diffusing sheets to be perpendicular to the liquid crystal display panel 6, and an upper diffusing sheet for diffusing the lights going through the first and second prism sheets to irradiate light onto the liquid crystal display panel 6. Thus, the lights from the first and second light guide plates 10 and 20 are irradiated via the optical sheets 8 to the liquid crystal display panel 6.

The top case 2 is manufactured in a shape of a square band having a plane part and a side part. The top case 2 encloses the edge of the liquid crystal display panel 6 and the main support 14.

As described above, since the LED driving circuits 34a and 34b emit incoherent colored lights, such as red light, green light and blue light, the LED driving circuits 34a and 34b are separated by at least a designated distances d1 and d2 from each of the first and the second light guide plates 10 and 20 to mix the red, green and blue lights into white light. For this reason, the scattering patterns 15 and 25 provided at the first and second light guide plates 10 and 20 are formed to separated by the designated distances of d1 and d2 from the incident surfaces of the first and the second light guide plate 10 and 20, respectively.

If the LED driving circuits 34a and 34b emitting the red, green and blue lights are used as light sources, then brightness of the lights from the first and second light guide plates 10 and 20 becomes uneven because partial areas of the first and second light guide plates 10 and 20 are used as regions in which the red, green and blue lights are mixed into a white light whereas the lights are scattered only at the remaining areas. In other words, light 36a emitted from the LED driving circuit 34a of the first LED array 30a arranged at the side surface of the first light guide plate 10 is scattered by the scattering pattern 15 provided at the first light guide plate 10 and the scattered light 38b then progresses toward the liquid crystal display panel 6. Also, light 36b emitted from the LED driving circuit 34b of the second LED array 30b arranged at the side surface of the second light guide plate 20 is scattered by the scattering pattern 25 provided at the second light guide plate 20 and the scattered light 38b then progresses toward the liquid crystal display panel 6.

The above-mentioned back light unit of the related art liquid crystal display module 1 has a drawback of increased thickness and weight since a set of two light guide plates 10 and 20 are used to obtain a uniform brightness. Furthermore, since the light 36a from the first light guide plate 10 goes through the second light guide plate 20, the brightness of the related art liquid crystal display module 1 becomes lower. The lowered brightness deteriorates a display quality of the liquid crystal display module 1.

Figure 4:
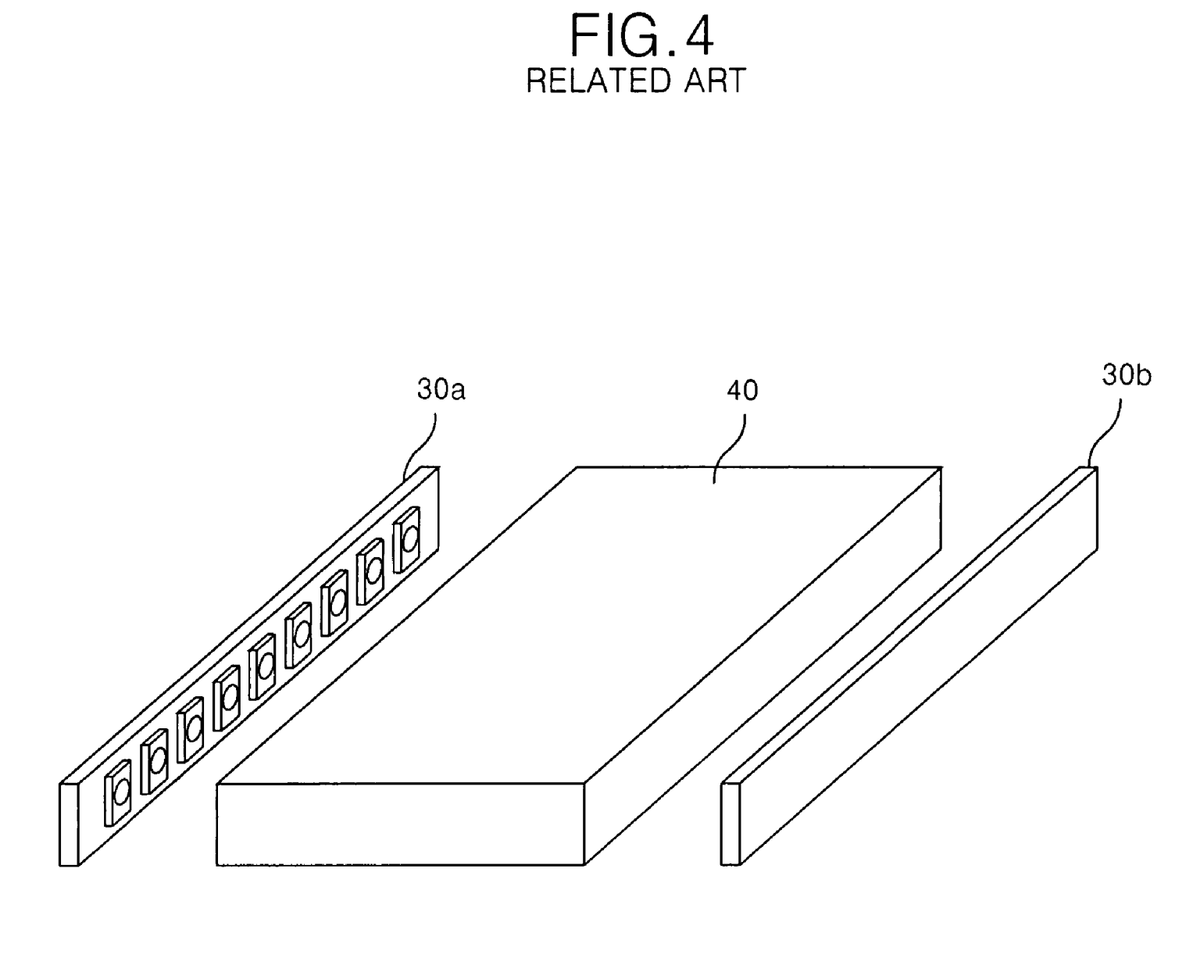
FIG. 4 shows an arrangement of a back light unit employing a color mixing light guide plate according to the related art.

FIG. 4 shows an arrangement of a back light unit employing a color mixing light guide plate. To solve the problems that the thickness of the back light unit becomes thick and brightness becomes uneven, there has been proposed a back light unit employing a light guide plate 40 for a color mixing as shown in FIG. 4. The color mixing light guide plate 40 doesn't require an area in which the red, green and green lights are mixed into white light as in the related art light guide plates 10 and 20 shown in FIG. 2. Thus, the back light unit can be made with one color mixing light guide plate 40 and therefore, it is possible to decrease the thickness of the back light unit. Further, by arranging the first and the second LED arrays 30a and 30b shown in FIG. 1 at both side surfaces of the color mixing light guide plate 40, the brightness of the light irradiated to the liquid crystal display panel 6 can be uniform. However, in the arrangement that a light source is arranged at the side surface of the color mixing light guide plate 40, light efficiency is low, so that brightness is lower accordingly. Thus, such an arrangement is still disadvantagous in that display quality of the liquid crystal display module deteriorates.

SUMMARY OF THE INVENTION

Accordingly, the present invention is directed to a liquid crystal display module that substantially obviates one or more of the problems due to limitations and disadvantages of the related art.

An object of the present invention to improve the display quality of a liquid crystal display module.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other objects of the invention, a liquid crystal display module according to an embodiment of the present invention includes: a liquid crystal display panel; an array of light sources emitting different color lights; and a light guide plate for mixing the different color lights emitted from the light sources, wherein the array of light sources is arranged near a middle of a rear surface of the light guide plate.

In another aspect, a liquid crystal display module includes: a liquid crystal display panel; light sources emitting different color lights; a light guide plate for mixing the color lights emitted from the light sources; a reflection plate on an upper surface of the light guide plate for reflecting the color lights from the light sources into the inside of the light guide plate; and a plurality of diffusing print patterns formed on a rear surface of the light guide plate for diffusing the color lights reflected by the reflection plates.

In a further aspect, a liquid crystal display module includes: a liquid crystal display panel; a first array of first light sources emitting first different color lights; a second array of second light sources emitting second different color lights; a light guide plate for mixing the first and second color lights emitted from the first array of first light sources and the second arrays of second light sources; a first plurality of grooves formed on a rear surface of the light guide plate, wherein portions of the first light sources in the first array are positioned in the first plurality of grooves, respectively; a second plurality of grooves formed on a rear surface of the light guide plate, wherein portions of the second light sources in the second array are positioned in the second plurality of grooves, respectively; a first reflection plate on an upper surface of the light guide plate positioned above the first array of first light sources; and a second reflection plate on the upper surface of the light guide plate positioned above the second array of second light sources.

It is to be understood that both the foregoing general description and the following detailed description are exemplary and explanatory and are intended to provide further explanation of the invention as claimed.

BRIEF DESCRIPTION OF THE DRAWINGS

These and other objects of the invention will be apparent from the following detailed description of the embodiments of the present invention with reference to the accompanying drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
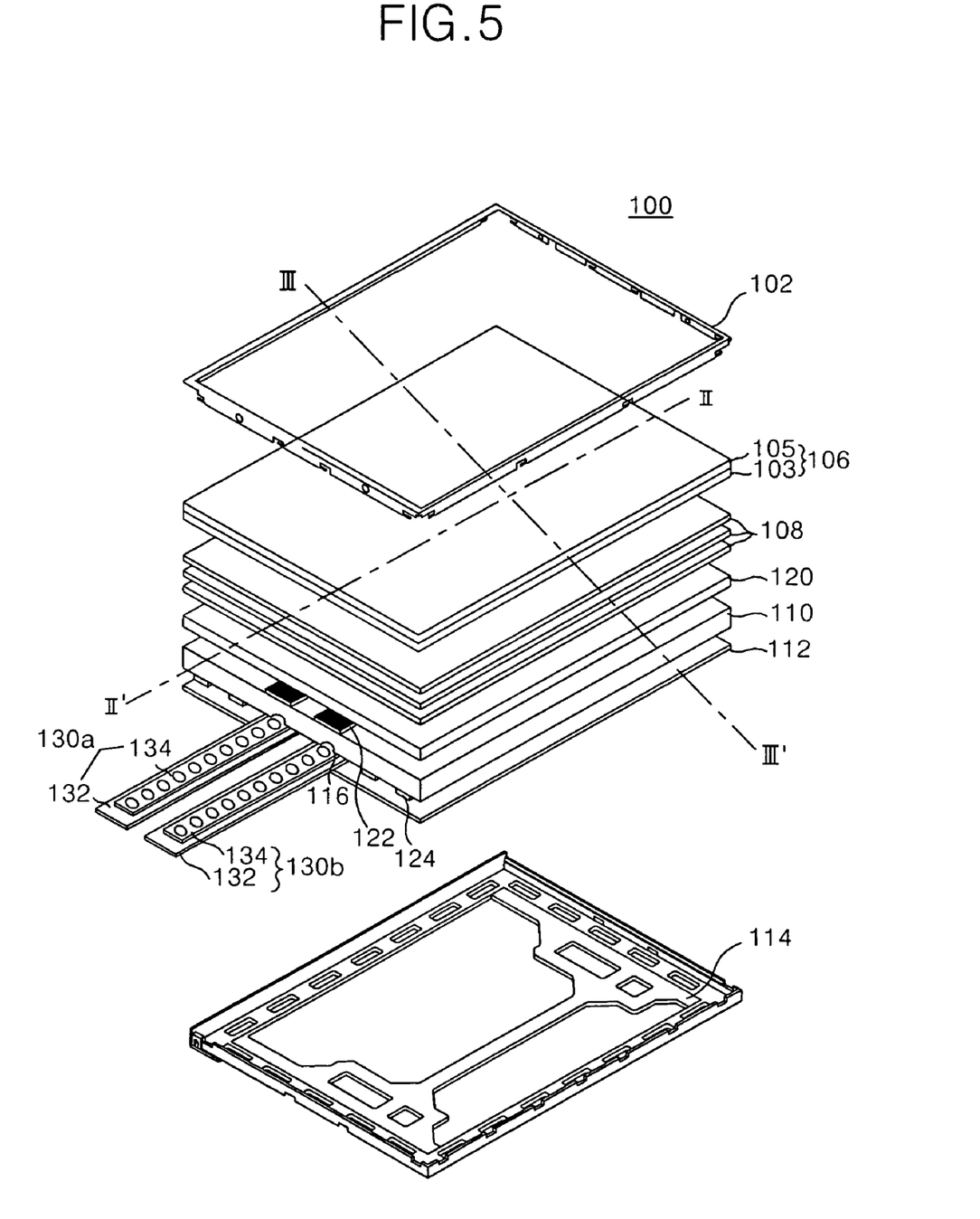
FIG. 5 is an expanded perspective view illustrating a liquid crystal display module according to an embodiment of the present invention.
Figure 6A:
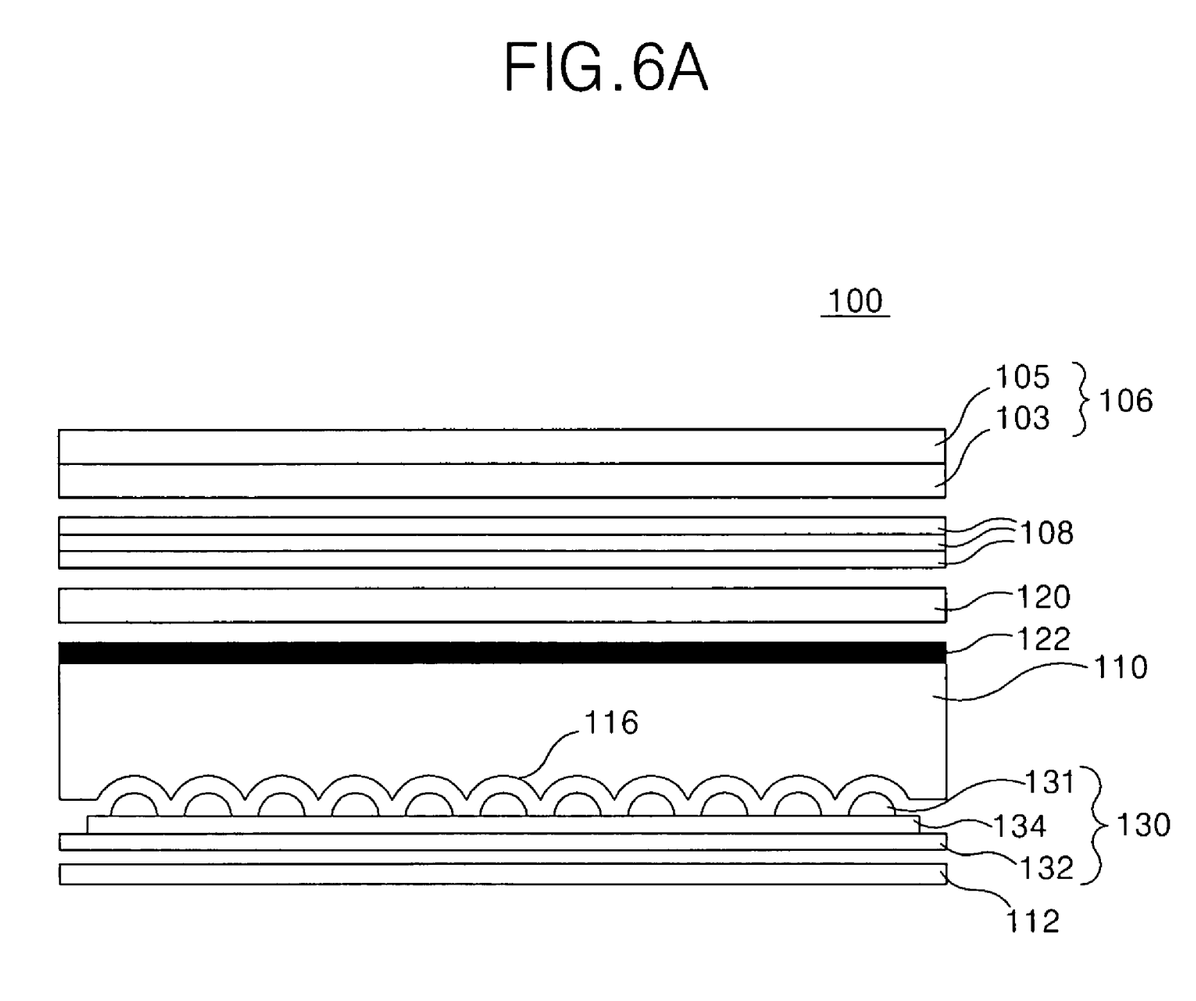
FIGS. 6A and 6B are exemplary cross-sectional views illustrating the liquid crystal display module taken along line II–II' in FIG 5.
Figure 6B:
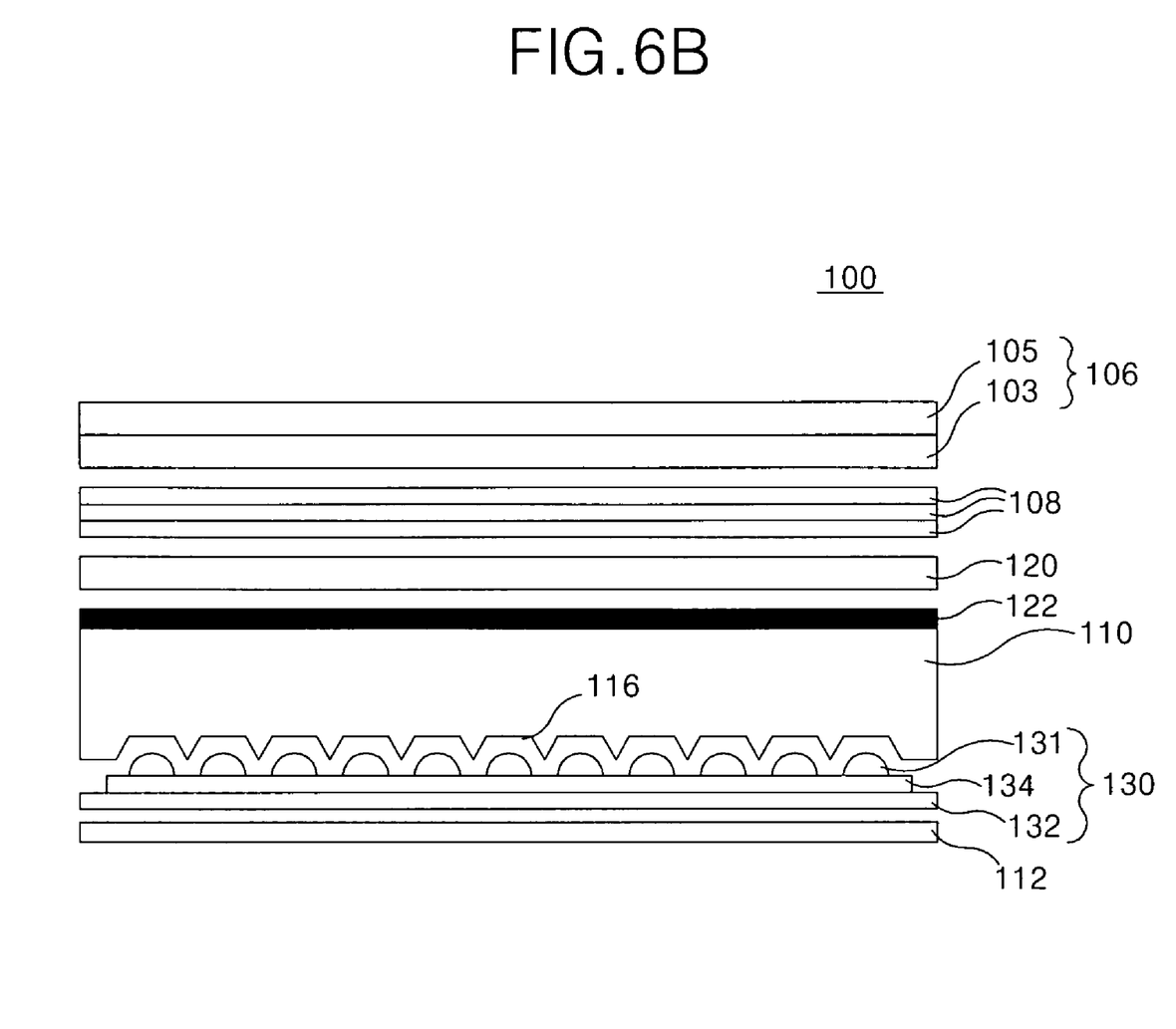

FIG. 5 is a perspective view illustrating a liquid crystal display module according to an embodiment of the present invention, and FIGS. 6A and 6B are exemplary cross-sectional views illustrating the liquid crystal display module taken along line II–II' in FIG. 5. Referring to FIGS. 5. 6A, and 6B, a liquid crystal display module 100 includes a main support 114, a back light unit and a liquid crystal display panel 106 stacked at an inside of the main support 114, and a top case 102 for enclosing the edge of the liquid crystal display panel 106 and the side surface of the main support 114.

The liquid crystal display panel 106 includes an upper substrate 105 and a lower substrate 103. Liquid crystal materials are injected between the upper substrate 105 and the lower substrate 103. The liquid crystal display panel 106 is provided with a spacer (not shown) for maintaining a cell gap between the upper substrate 105 and the lower substrate 103. The upper substrate 105 of the liquid crystal display panel 106 is provided with a color filter, a common electrode and a black matrix (not shown). Signal lines, such as a data line and a gate line (not shown), are formed at the lower substrate 103 of the liquid crystal display panel 106. A thin film transistor (TFT) is formed adjacent to the crossing of the data line and the gate line. The TFT switches a data signal from the data line to the liquid crystal cell in response to a scanning pulse (i.e., a gate pulse) from the gate line. A pixel electrode is formed at a pixel region between the data line and the gate line.

A pad area is formed on one side of the lower substrate 103 and has pads connected to each of the data line and the gate line. A tape carrier package (not shown) having a driver integrated circuit mounted thereon for applying a driving signal to the TFT is attached onto the pad area. This tape carrier package applies a data signal from the driver integrated circuit to the data line. Further, the tape carrier package supplies the scanning signal to the gate line. An upper polarizing sheet is attached onto the upper substrate 105 of the liquid crystal display panel 106, and a lower polarizing sheet is attached onto of the rear side of the lower substrate 103 of the liquid crystal display panel 106.

The main support 114 is made from a mold material, and its inner lateral wall is molded into a stepped coverage face. The stepped coverage face has a securing part in which the back light unit and the liquid display panel 106 are disposed is formed on the stepped coverage face. The liquid crystal display panel 106 and the back light unit are stacked in the securing part of the main support 114.

The back light unit includes: a color mixing light guide plate 110 arranged to face the rear surface of the liquid crystal display panel 106; a plurality of light-emitting diode (LED) arrays 130a and 130b are arranged in parallel and face the rear surface of the color mixing light guide plate 110; a reflection sheet 112 is arranged on the rear surface of the color mixing light guide plate 110 and the LED arrays 130a and 130b; a diffusion plate 120 arranged on the color mixing light guide plate 110; and a plurality of optical sheets 108 arranged on the diffusion plate 120. The reflection sheet is arranged to face the rear surface of the light guide plate 110 and the rear of the plurality of light-emitting diode (LED) arrays 130a and 130b.

The trend in back light unit is toward small size, thin thickness and lightweight. Pursuant to this trend, the LED array is used as a light source for the liquid crystal display module 100 of an embodiment of the present invention, which is advantageous in power consumption, thickness, weight and brightness in comparison with a fluorescent lamp that is used in the related art as a light source for a back light unit. In the related art liquid crystal display module in which the LED array is employed as a light source, two light guide plates are used to constitute the back light unit. However, in the liquid crystal display module 100 according to an embodiment of the present invention, the LED arrays 130a and 130b emitting red, green, blue and white color lights are located on the rear surface of the color mixing light guide plate 110, and the diffusion plate 120 for diffusing light output from the color mixing light guide plate 100 is arranged on the color mixing light guide plate 110.

Each of the LED arrays 130a and 130b includes a plurality of LEDs 131, a driving circuit 134 for controlling the emission of the LEDs 131, and a printed circuit board (PCB) 132 having the driving circuit 134 mounted thereon.

Figure 7:
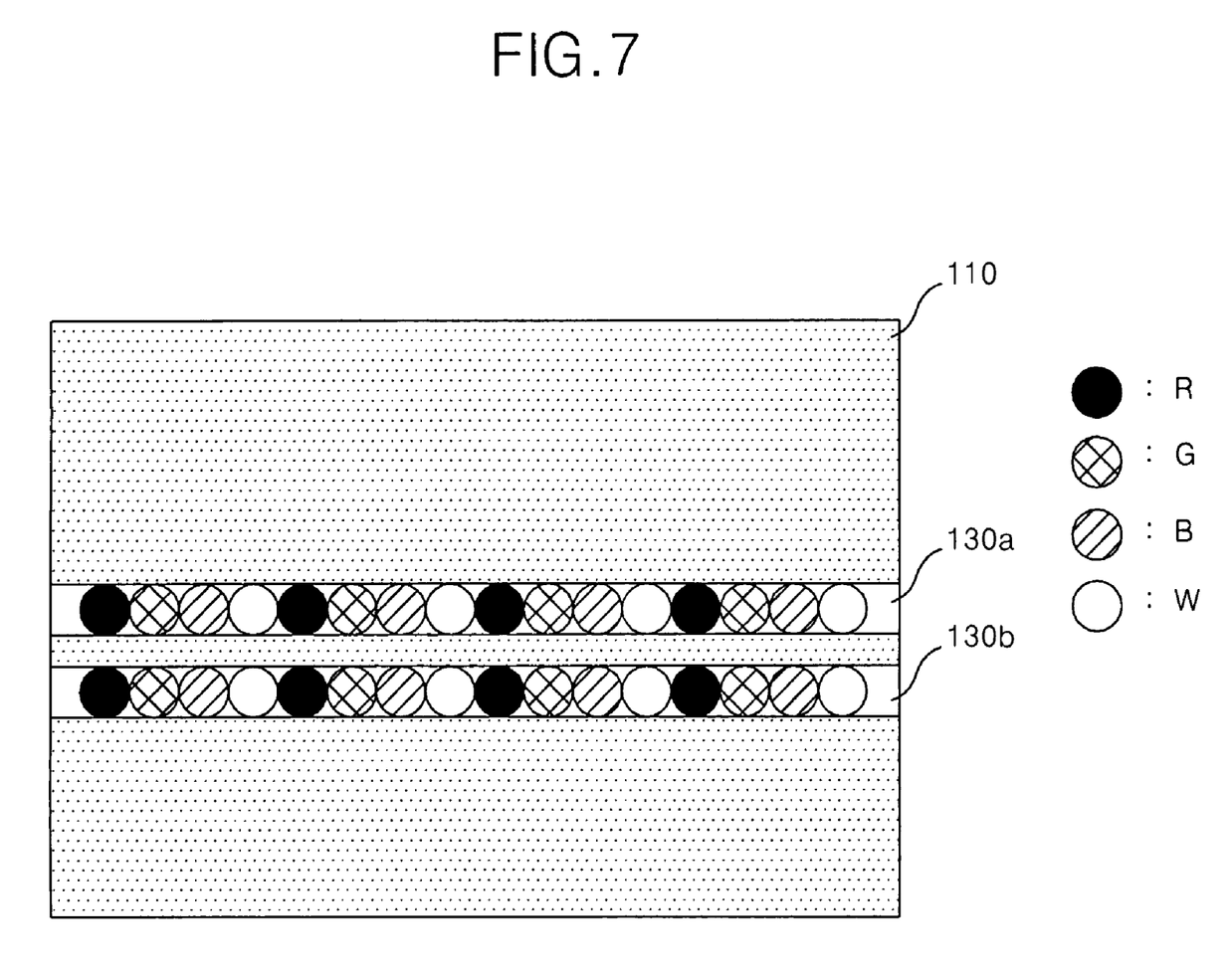
FIG. 7 is a plan view illustrating the light-emitting diode array and the color mixing light guide plate shown in FIG. 5.
Figure 8:
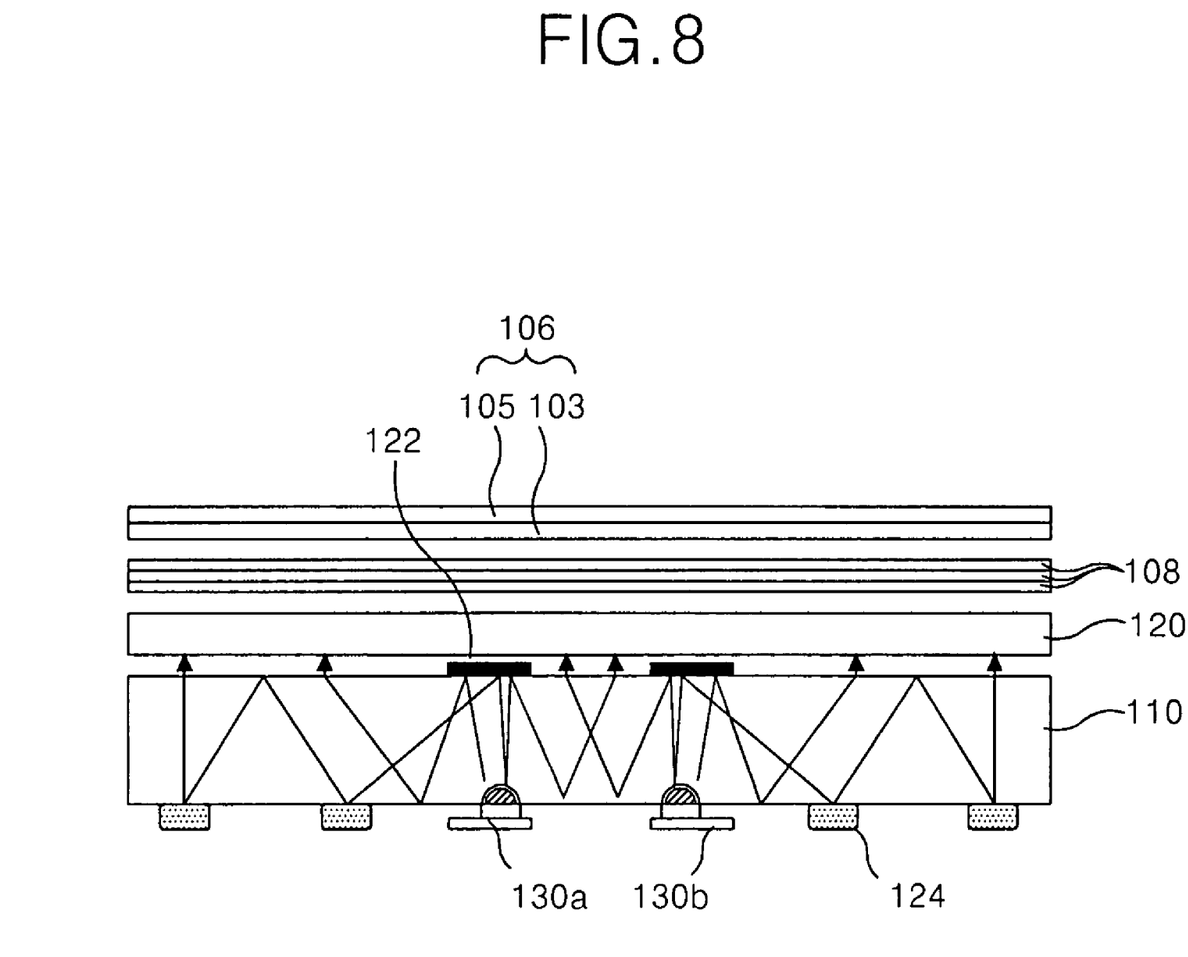
FIG. 8 is a cross-sectional view illustrating the liquid crystal display module taken along line III–III' in FIG. 5.

FIG. 7 is a plan view illustrating the light-emitting diode array and the color mixing light guide plate shown in FIG. 5. The LEDs 131, as shown in FIG. 7 include red, green, blue and white LEDs that emit the color lights of red, green, blue and white. The LEDs 131 are point light sources in which the red, green, blue and white LEDs are repeatedly and alternately arranged. Further, each of the LED arrays 130a and 130b is arranged adjacent or near the middle of the rear surface of the light guide plate in a vertical direction of the light guide plate. Each of the LEDs 131 has a lens with a convex shape. The driving circuit 134 connected to the LEDs 131 permits the red, green, blue and white LEDs to emit their respective corresponding lights. The driving circuit 134 is individually integral in the rear surface of each of the LEDs 131 or is commonly integral in the rear surface of each of the LED arrays 130a and 130b.

Each of LED arrays 130a and 130b is arranged on the rear surface of the color mixing light guide plate 110 as light sources for color lights. The reflection sheet 112 reflects any light progressing out from the rear surface of the color mixing light guide plate 110 so as to redirect it toward the liquid crystal display panel 106. The color mixing light guide plate 110 internally reflects, diffuses and mixes the color lights irradiated from the LED arrays 130a and 130b, and then irradiates white light toward the diffusion plate 120. To this end, the color mixing light guide plate 110, which is formed on the rear surface of the color mixing light guide plate 110, includes a plurality of grooves 116 having a round shape in which the LEDs 131 are positioned, as illustrated in FIG. 6A. The LEDs 131 are positioned into the round-concave grooves 116 to decrease the thickness of the back light unit. Alternatively, the grooves 116 may have a polygonal shape rather than the round shape. For example. FIG. 6B illustrates an example of a polygonal shape for grooves 116. However, other polygonal shapes may be used.

The liquid crystal display module 100 according to an embodiment of the present invention further includes: a plurality of reflection plates 122 formed on an upper surface of the color mixing light guide plate 110 through the use of a printing method and a depositing method that overlaps each of the LED arrays 130a and 130b; and a plurality of diffusing print patterns 124 formed on a rear surface of the color mixing light guide plate 110 between the concave grooves 116 and both edges of the color mixing light guide plate 110. The reflection plates 122 reflect the lights, emitted from the LED arrays 130a and 130b and incident to the reflection plates 122, toward the diffusing print patterns 124. The diffusing print patterns 124 diffuses light reflected from the reflection plates 122 and incident to the diffusing print pattern 124 over a large area. The lights emitted from the LED arrays 130a and 130b mix into white light inside of the color mixing light guide plate 110, in addition, the light that is provided from the LED arrays 130a and 130b, which has not mixed into white light is reflected from the reflection plates 122 toward the inside of the color mixing light guide plate 110 and then is diffused by the diffusing print patterns 124 so as to exit from the color mixing light guide plate 110 over a wide area as white light.

Even though the light output from the color mixing light guide plate 110 exits over a wide area, the brightness of the light output from the color mixing light guide plate 110 is partially uneven. This is because light does not exit from a portion of the color mixing light guide plate 110 covered by the reflection plates 122 formed on the upper surface of the color mixing light guide plate 110. In other words, the light is not output from the entire surface of the color mixing light guide plate 110. Accordingly, the diffusion plate 120 arranged between the color mixing light guide plate 110 and the optical sheets 108 redirects light received from the color mixing light guide plate 110 toward the front surface of the liquid crystal display panel 106 so as to diffuses the light for a uniform distribution over a wide area. The diffused light having the uniform distribution is irradiated onto the optical sheets 108. The diffusion plate 120 includes a transparent resin film in which both surfaces are coated with light-diffusion materials.

The optical sheets 108 diffuse the light from the color mixing light guide plate 110 and redirect the path of the light to be perpendicular to the liquid crystal display panel 106, to thereby improve a light efficiency. To this end, a lower diffusing sheet is arranged on the color mixing light guide plate 110 for uniformly diffusing the light provided from the diffusion plate 120, first and second prism sheets for redirecting the light diffused by the lower diffusing sheets to be perpendicular to the liquid crystal display panel 106, and an upper diffusing sheet for diffusing the light passing through from the first and second prism sheets that irradiates onto the liquid crystal display panel 106. Thus, light from the diffusion plate 120 is irradiated via the optical sheets 108 onto the liquid crystal display panel 106. The lower diffusing sheet among the plurality of the optical sheets 108 may be removed since the diffusion plate 120 can be sufficient.

The top case 102 is manufactured with a shape of a square band having a plane part and a side part. The top case 102 encloses the edge of the liquid crystal display panel 106 and the main support 114.

According to the liquid crystal display module 100 of an embodiment of the present invention, the LED arrays 130a and 130b emitting the red, green, blue and white color lights are employed as light sources. The color lights are mixed in the color mixing light guide plate 110 to enhance color purity and brightness of the light irradiated onto the liquid crystal display panel 106. Further, the grooves 116 are formed on the rear surface of the color mixing light guide plate 110 and the LEDs 131 are positioned in the grooves 116 so as to decrease the thickness of the back light unit. Furthermore, the diffusing print patterns 124 formed on the rear surface of the color mixing light guide plate 110 uniformly diffused white light over a wide area. Therefore, embodiments of the present invention improve display quality of the liquid crystal display module.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display module comprising:
   a liquid crystal display panel;
   light sources emitting different color lights;
   a light guide plate for mixing the color lights emitted from the light sources;
   a reflection plate on an upper surface of the light guide plate for reflecting the color lights from the light sources into the inside of the light guide plate; and
   a plurality of diffusing pattern strips formed on a rear surface of the light guide plate for diffusing the color lights reflected by the reflection plate.

2. The liquid crystal display module according to claim 1, wherein each of the light sources is arranged near a middle of the rear surface of the light guide plate.

3. The liquid crystal display module according to claim 1, wherein each of the light sources includes a light-emitting diode array having a plurality of light-emitting diodes.

4. The liquid crystal display module according to claim 3, wherein the light-emitting diode array includes:
   a printed circuit board;
   a set of red, green, blue and white light-emitting diodes repeatedly arranged on the printed circuit board; and
   a driving circuit for driving the red, green, blue and white light-emitting diodes.

5. The liquid crystal display module according to claim 1, wherein the reflection plate overlaps each of the light sources.

6. The liquid crystal display module according to claim 1, further comprising a plurality of grooves formed on the rear surface of the light guide plate, wherein portions of the light sources are positioned in the grooves.

7. The liquid crystal display module according to claim 6, wherein the light-emitting diodes are positioned in the grooves.

8. The liquid crystal display module according to claim 6, wherein each of the grooves has one of a round shape and a polygonal shape.

9. The liquid crystal display module according to claim 1, further comprising:
   a reflection sheet arranged to face the rear surface of the light guide plate and located behind the light sources;
   a diffusion plate arranged over the upper surface of the light guide plate; and
   a plurality of optical sheets arranged over the diffusion plate.

10. A liquid crystal display module comprising:
    a liquid crystal display panel;
    a first array of first light sources emitting first different color lights;
    a second array of second light sources emitting second different color lights;
    a light guide plate for mixing the first and second color lights emitted from the first array of first light sources and the second array of second light sources;
    a first plurality of grooves formed on a rear surface of the light guide plate, wherein portions of the first light sources in the first array are positioned in the first plurality of grooves, respectively;
    a second plurality of grooves formed on the rear surface of the light guide plate, wherein portions of the second light sources in the second array are positioned in the second plurality of grooves, respectively;
    a first reflection plate on an upper surface of the light guide plate positioned above the first array of first light sources;
    a second reflection plate on the upper surface of the light guide plate positioned above the second array of second light sources; and
    diffusing print patterns formed on the rear surface of the light guide plate for diffusing the color lights reflected by the reflection plates.

11. The liquid crystal display module according to claim 10, further comprising a plurality of diffusing print patterns formed on the rear surface of the light guide plate for diffusing the first and second color lights reflected by the first and second reflection plates.

12. The liquid crystal display module according to claim 10, further comprising a reflection sheet arranged to face to the rear surface of the light guide plate and located behind the first and second arrays.

13. The liquid crystal display module according to claim 10, further comprising:
    a diffusion plate arranged over the upper surface of the light guide plate; and
    a plurality of optical sheets arranged over the diffusion plate.

14. The liquid crystal display module according to claim 10, wherein each of the first and second arrays includes:
    a printed circuit board;
    a set of red, green, blue and white light-emitting diodes repeatedly arranged on the printed circuit board; and
    a driving circuit for driving the red, green, blue and white light-emitting diodes.

15. A liquid crystal display module comprising:
    a liquid crystal display panel;
    a plurality of the circuit boards, each of the circuit boards having light sources arranged in a single row array, the array of light sources emitting different color lights;
    a light guide plate for mixing the different color lights emitted from the light sources, wherein the array of light sources is arranged near a middle of a rear surface of the light guide plate; and
    a plurality of the reflection plates on an upper surface of the light guide plate for reflecting the different color lights from the array of light sources into an inside of the light guide plate,
    wherein each of the reflection plates are positioned above each of the corresponding circuit boards such that each reflection plate overlaps each of the light sources on the corresponding circuit board.

16. The liquid crystal display module according to claim 15, further comprising a plurality of diffusing pattern strips formed on the rear surface of the light guide plate for diffusing the different color lights reflected by the reflection plates.

17. The liquid crystal display module according to claim 15, further comprising a plurality of grooves formed on the rear surface of the light guide plate, wherein portions of the light sources are positioned in the grooves.

18. The liquid crystal display module according to claim 17, wherein each of the grooves has one of a round shape and a polygonal shape.

19. The liquid crystal display module according to claim 15, further comprising:
    a reflection sheet arranged to face the rear surface of the light guide plate and located behind the light source array;
    a diffusion plate arranged over the upper surface of the light guide plate; and
    a plurality of optical sheets arranged over the diffusion plate.

20. The liquid crystal display module according to claim 15, wherein the light sources are light emitting diodes (LEDs).

21. The liquid crystal display module according to claim 20, wherein the circuit board includes:
    a set of red, green, blue and white LEDs repeatedly arranged on the circuit board; and
    a driving circuit for driving the red, green, blue and white LEDs.

* * * * *